US010810136B2

United States Patent
Leiserson et al.

(10) Patent No.: US 10,810,136 B2
(45) Date of Patent: Oct. 20, 2020

(54) INDEXING OF MEMORY PAGES TO PROVIDE SECURE MEMORY ACCESS

(71) Applicant: Fortanix, Inc., Mountain View, CA (US)

(72) Inventors: Andrew Leiserson, San Francisco, CA (US); Jethro Gideon Beekman, San Francisco, CA (US)

(73) Assignee: Fortanix, Inc., Mountain View, CA (US)

( * ) Notice: Subject to any disclaimer, the term of this patent is extended or adjusted under 35 U.S.C. 154(b) by 0 days.

(21) Appl. No.: 16/006,655

(22) Filed: Jun. 12, 2018

(65) Prior Publication Data

US 2019/0377692 A1  Dec. 12, 2019

(51) Int. Cl.
*G06F 12/14* (2006.01)
*G06F 12/0882* (2016.01)
*G06F 12/0877* (2016.01)

(52) U.S. Cl.
CPC .......... *G06F 12/14* (2013.01); *G06F 12/0882* (2013.01); *G06F 12/0877* (2013.01); *G06F 2212/1052* (2013.01); *G06F 2212/608* (2013.01)

(58) Field of Classification Search
CPC .. G06F 12/14; G06F 12/0882; G06F 12/0877; G06F 2212/1052; G06F 2212/608
See application file for complete search history.

(56) References Cited

U.S. PATENT DOCUMENTS

2007/0079106 A1* 4/2007 Davis ................. G06F 12/1018
711/203

OTHER PUBLICATIONS

Y. Xu, W. Cui, and M. Peinado, "Controlled-Channel Attacks: Deterministic Side Channels for Untrusted Operating Systems," in Proceedings of the 2015 IEEE Symposium on Security and Privacy, Washington, DC, USA, 2015, pp. 640-656. 17 pages.
M. Hähne!, W. Cui, and M. Peinado, "High-Resolution Side Channels for Untrusted Operating Systems," in 2017 USENIX Annual Technical Conference (USENIX ATC 17), Santa Clara, CA, 2017, pp. 299-312. 15 pages.
F. Brasser et al., "DR.SGX: Hardening SGX Enclaves against Cache Attacks with Data Location Randomization," ArXiv170909917 Cs, Sep. 2017. 16 pages.
F. Brasser et al., "Software Grand Exposure: SGX Cache Attacks Are Practical," arXiv:1702.07521v1 Cs, Feb. 24, 2017. 17 pages.
S. Chen, X. Zhang, M. K. Reiter, and Y. Zhang, "Detecting Privileged Side-Channel Attacks in Shielded Execution with DéJà Vu," in Proceedings of the 2017 ACM on Asia Conference on Computer and Communications Security, New York, NY, USA, 2017, pp. 7-18. 12 pages.
Y. Jang, J. Lee, S. Lee, and T. Kim, "SGX-Bomb: Locking Down the Processor via Rowhammer Attack," in SysTEX, 2017. 6 pages.

(Continued)

*Primary Examiner* — David Yi
*Assistant Examiner* — Dustin B. Fulford
(74) *Attorney, Agent, or Firm* — Lowenstein Sandler LLP

(57) ABSTRACT

An input data may be received. Memory pages may be identified where each of the memory pages includes one or more cache lines. A first index table that includes cache lines may be generated from the memory pages based on the input data. Subsequently, an output data may be provided based on a particular cache line from the cache lines of the first index table.

20 Claims, 8 Drawing Sheets

(56) References Cited

OTHER PUBLICATIONS

Frassetto, Tommaso et al. "JITGuard: Hardening Just-in-time Compilers with SGX." CCS (2017). 15 pages.
B. W. Lampson, "A Note on the Confinement Problem." (2018) 5 pages.
S. Lee, M.W. Shih, P. Gera, T. Kim, H. Kim, and M. Peinado, "Inferring Fine-grained Control Flow Inside SGX Enclaves with Branch Shadowing," in 26th USENIX Security Symposium (USENIX Security 17), Vancouver, BC, 2017, pp. 557-574. 19 pages.
M. Schwarz, S. Weiser, D. Gruss, C. Maurice, and S. Mangard, "Malware Guard Extension: Using SGX to Conceal Cache Attacks," ArXiv170208719 Cs, Feb. 2017. 16 pages.
D. Gruss, J. Lettner, and F. Schuster, "Strong and Efficient Cache Side-Channel Protection using Hardware Transactional Memory." 19 pages.
Shih, M., Lee, S., Kim, T., & Peinado, M. (2017). T-SGX: Eradicating Controlled-Channel Attacks Against Enclave Programs. NDSS. 15 pages.
Shweta Shinde et al., "Preventing Your Faults from Telling Your Secrets: Defenses against Pigeonhole Attacks," arXiv:1506.04832v2 Cs, Jan. 12, 2016. 16 pages.
Bulck, J.V., Piessens, F., & Strackx, R. (2017). SGX-Step: A Practical Attack Framework for Precise Enclave Execution Control. SysTEX'17. 6 pages.
J. V. Bulck, N. Weichbrodt, R. Kapitza, F. Piessens, and R. Strackx, "Telling Your Secrets without Page Faults: Stealthy Page Table-Based Attacks on Enclaved Execution," in 26th USENIX Security Symposium (USENIX Security 17), Vancouver, BC, 2017, pp. 1041-1056. 16 pages.
S. Sasy, S. Gorbunov, and C. W. Fletcher, "ZeroTraceE: Oblivious Memory Primitives from Intel SGX," 549, 2017. 15 pages.
Intel® Software Guard Extensions Developer Guide. (2016) 34 pages.
T. Ristenpart, E. Tromer, H. Shacham, and S. Savage, "Hey, You, Get off of My Cloud: Exploring Information Leakage in Third-party Compute Clouds," in Proceedings of the 16th ACM Conference on Computer and Communications Security, New York, NY, USA, 2009, pp. 199-212. 14 pages.
Unknown. (2018). Meltdown and Spectre. https://meltdownattack.com/. Retrieved on Jun. 12, 2018. 21 pages.
Jann Horn et al. (2018) Project Zero. https://googleprojectzero.blogspot.com/. Retrieved on Jun. 12, 2018. 10 pages.

* cited by examiner

INDEXING OF MEMORY PAGES TO PROVIDE SECURE MEMORY ACCESS

TECHNICAL FIELD

Aspects of the present disclosure relate generally to secure memory, and more specifically, relate to the indexing of memory pages to provide secure memory access.

BACKGROUND

A device may be susceptible to a side channel attack where information may be obtained from observations of the device while the device is operating. For example, the device may utilize secret information (e.g., a cryptographic key) to generate an output. If an attacker (e.g., an unauthorized entity) is able to observe a certain behavior of the device while the device is performing an operation that utilizes the secret information, then the attacker may be able to obtain information that may be used to reconstruct the secret information. As a result the security of the device may be compromised.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
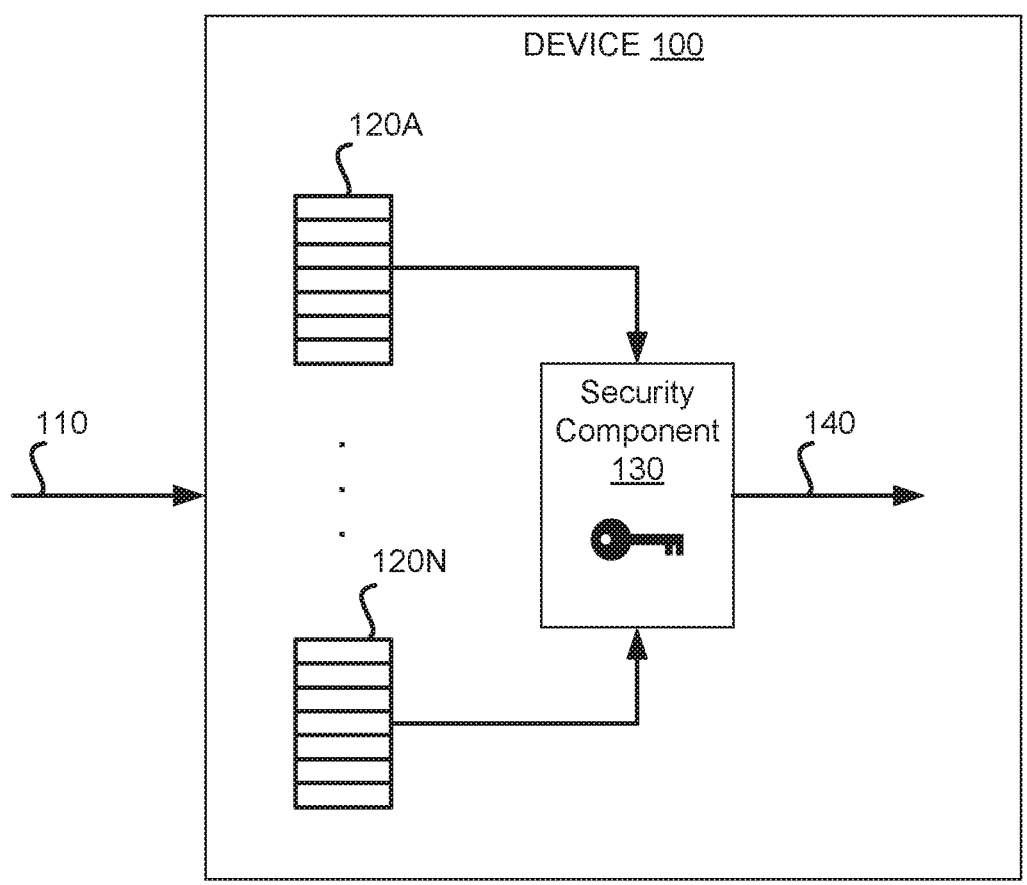
FIG. 1 illustrates an example device to provide secure memory access in accordance with some embodiments.

Aspects of the present disclosure relate to the indexing of memory pages to provide secure memory access. In general, a device may include memory pages that include multiple entries where each entry of a memory page corresponds to a cache line. A particular cache line may be data that is stored at a cache memory. During an operation that is performed by the device, the cache memory of the device may be accessed. For example, a particular operation may utilize a particular cache line at a particular memory page. The operation may utilize secret information (e.g., a cryptographic key or other such secret data). However, if an attacker or an unauthorized entity is able to observe the accessing of a particular memory page or a particular cache line when the operation is being performed, then the attacker may be able to use data from the observations to mathematically recreate the secret information. As a result, the observation of an access pattern of memory pages and cache lines of the memory pages may be a source of information for an attacker to recreate the secret information during a side channel attack of the device.

Aspects of the present disclosure address the above and other deficiencies by indexing the memory pages to provide secure memory access. For example, multiple memory pages may be accessed during the performance of the operation when data from a single cache line at a single memory page is to be retrieved. The accessing of multiple memory pages and multiple cache lines from the memory pages as opposed to the accessing of a single cache line at a single memory page may result in the access pattern of the memory pages being less correlated with the secret information that is used during the performance of the operation. Thus, if an attacker observes the accessing of the memory pages of the device while the operation is being performed with secret information, the data from the observations may not correlate with the secret information that was used as unrelated memory pages and unrelated cache lines may also be accessed as opposed to only the memory page with the cache line that is being requested as part of the operation being performed. As a result, the secret information used during the performance of the operation may be more secure.

In some embodiments, the operation may be a cryptographic operation that uses input data (e.g., a cryptographic key or an input value). When the input data is received, multiple memory pages may be accessed based on the values of the input data. For example, the memory pages may be indexed into one or more memory tables based on particular values. A first set of index tables may include cache lines from the memory pages that include a first value (e.g., at first portion of a memory address). A next set of index tables may include cache lines from the first set of index tables that include a second value (e.g., at second portion of the memory address). Subsequent sets of index tables may include or be indexed from cache lines of a prior set of index tables based on the cache lines having the same value at another portion. When the input data is received, the cache lines from the memory pages at the different sets of index tables may be accessed based on the values of the input data. For example, a first index table may include cache lines at the memory pages that match a first value of the input data. Subsequent index tables may be selected based on other portions of the values at the cache lines matching other values of the input data until a final cache line with a value that matches the input data is identified. Subsequently, the final cache line may be used to retrieve data that is associated with an output of the cryptographic operation. As a result, since multiple cache lines from multiple memory pages are accessed through the use of multiple index tables while the final cache line is used to provide the output of the cryptographic operation, the access pattern of the cache lines and memory pages may be less correlated with the input data as unrelated cache lines and memory pages are also accessed during the performance of the cryptographic operation.

Advantages of the present disclosure include, but are not limited to, an improved security of a device by reducing the susceptibility of the device to a side channel attack. For example, the susceptibility of the device to the side channel attack may be reduced by having the access patterns of the memory of the device be independent from an input value that is used by an operation. As a result, data that is based on observations of the access patterns of the memory may not be used to reconstruct the input value that is used by the operation.

FIG. 1 illustrates an example device 100 to index memory pages to provide secure memory access. The device 100 may include a security component 130 that corresponds to processing logic that may include hardware (e.g., processing device, circuitry, dedicated logic, programmable logic, microcode, hardware of a device, integrated circuit, etc.), software (e.g., instructions run or executed on a processing device), or a combination thereof.

As shown in FIG. 1, the device 100 may include memory pages 120A to 120N and a security component 130. The device 100 may receive an input 110. For example, the input 110 may be information to be used in an operation that uses data from memory pages 120A to 120N. In some embodiments, the input 110 may be plaintext data that is to be encrypted by a cryptographic operation that uses a cryptographic key that is included at the device 100. In general, each memory page 120A to 120N may include multiple cache lines where each cache line may include data that has been copied from a memory to a cache memory. Furthermore, each cache line may include the data and a memory location (e.g., an address). The security component 130 may generate index tables to provide secure memory access for the memory pages 120A to 120N when performing the operation with the input 110 to generate an output 140. For example, as described in further detail below, the security component 130 may access the memory pages 120A to 120N to generate the index tables based on the value of bits of the input 110 when generating the output 140. In some embodiments, the security component 130 may generate index tables for the memory pages 120A to 120N based on particular values of the cache lines stored at the memory pages 120A to 120N. Subsequently, the security component 130 access cache lines from the memory pages 120A to 120N by using the index tables and may provide the output 140 based on a particular cache line from the indexed memory tables.

Figure 2:
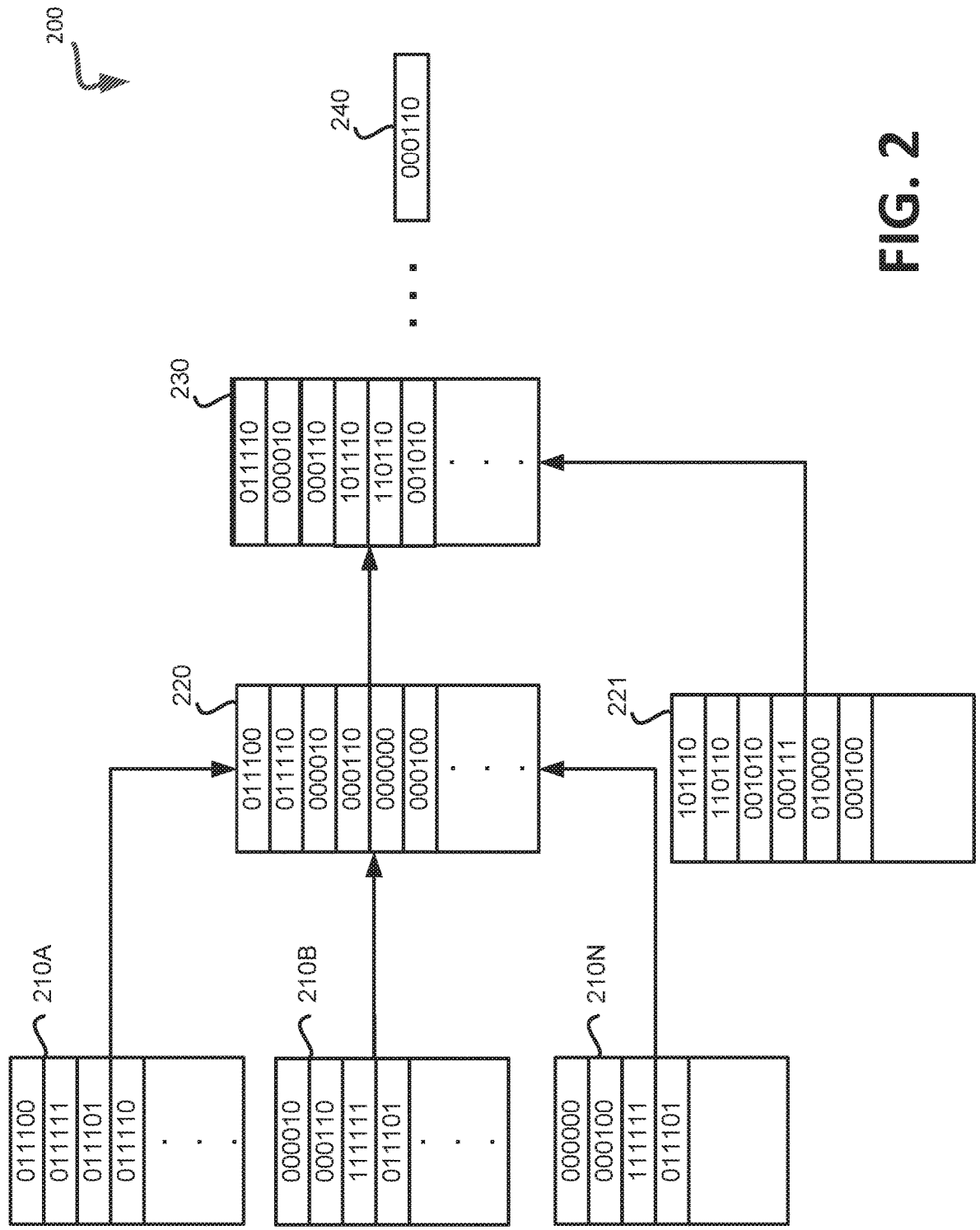
FIG. 2 illustrates a block diagram of index tables to provide secure memory access of memory pages in accordance with some embodiments of the present disclosure.

FIG. 2 illustrates a computer environment 200 of index tables 220, 221, and 230 to provide secure memory access of memory pages. In general, the security component 130 of FIG. 1 may provide the indexing of the memory pages.

As shown in FIG. 2, a first hierarchy of memory pages may include memory pages 210A, 210B, and 210N. The memory pages 210A, 210B, and 210N may include cache lines that may be identified by addresses or may be associated with memory locations. The first hierarchy of memory pages may be indexed as represented by a first index table 220 at a second hierarchy. For example, the first index table 220 may index the memory pages 210A, 210B, and 210N based on a portion of the memory address having a particular value. For example, the first index page 220 may include cache lines from the memory pages 210A, 210B, and 210N where the least significant bit of the cache line address is a value of '0.' Thus, the first index page 220 may include cache lines that have the same particular value at a portion of the address and that are from various memory pages. In some embodiments, another index table 221 may be included at the second hierarchy. For example, the other index table 221 may include other cache lines from other memory pages at the first hierarchy (not shown) that also include cache lines where the portion of the cache line address has the same particular value as the cache lines included in the first index table 220. Furthermore, a third hierarchy may be represented by a second index table 230 that indexes the first index table 220 and the other index table 221 based on another value. The second index table 230 may index the cache lines from the first index table 220 and the other index table 221 based on another particular value. For example, the second index table 230 may include cache lines from the first index table 220 and the other index table 221 that include a value of '1' at the second least significant bit. Thus, the second index table 230 may represent cache lines from the memory pages where the two least significant bits are a '10' and that were indexed by the first index table 220 and the other index table 221. Subsequent hierarchies of index tables may index the prior index tables based on additional values of cache lines. For example, a third index table may include the cache lines from the second index table 230 (and any other index tables at the third hierarchy) where the third least significant bit of the address of a cache line is a value of '1.' As such, multiple index tables may be generated based on values of the cache lines. Thus, a first number of the index tables may include a subset of the cache lines from memory pages based on a first value. A second number of the index tables may include a subset of the cache lines included in the first number of the index tables based on another value.

Although the indexing of memory pages based on a particular value are described, any combination of values may be used to index the memory pages. For example, a memory page may be used to index cache lines based on a value of any number of bits. For example, the memory pages may be indexed for a particular index table based on one bit or two or more bits (e.g., any combination of the least significant bit, most significant bit, or other bits). Additionally, the indexing of memory pages may interpret the memory address of the cache line relative to a base memory address. In some embodiments, the base address may be the memory address of the first cache line. For example, the indexing may subtract the base address from the memory addresses of subsequent cache lines, and index cache lines based on the value of bits in the difference between memory addresses of respective cache lines and the base address. For example, if the first memory page corresponds to a memory address of '100000,' then the value of '100000' may be subtracted from subsequent memory addresses.

In operation, the index tables may be used to access cache lines based on an input. For example, cache lines that match the particular value that is being indexed may be accessed as described in conjunction with FIG. 3.

Figure 3:
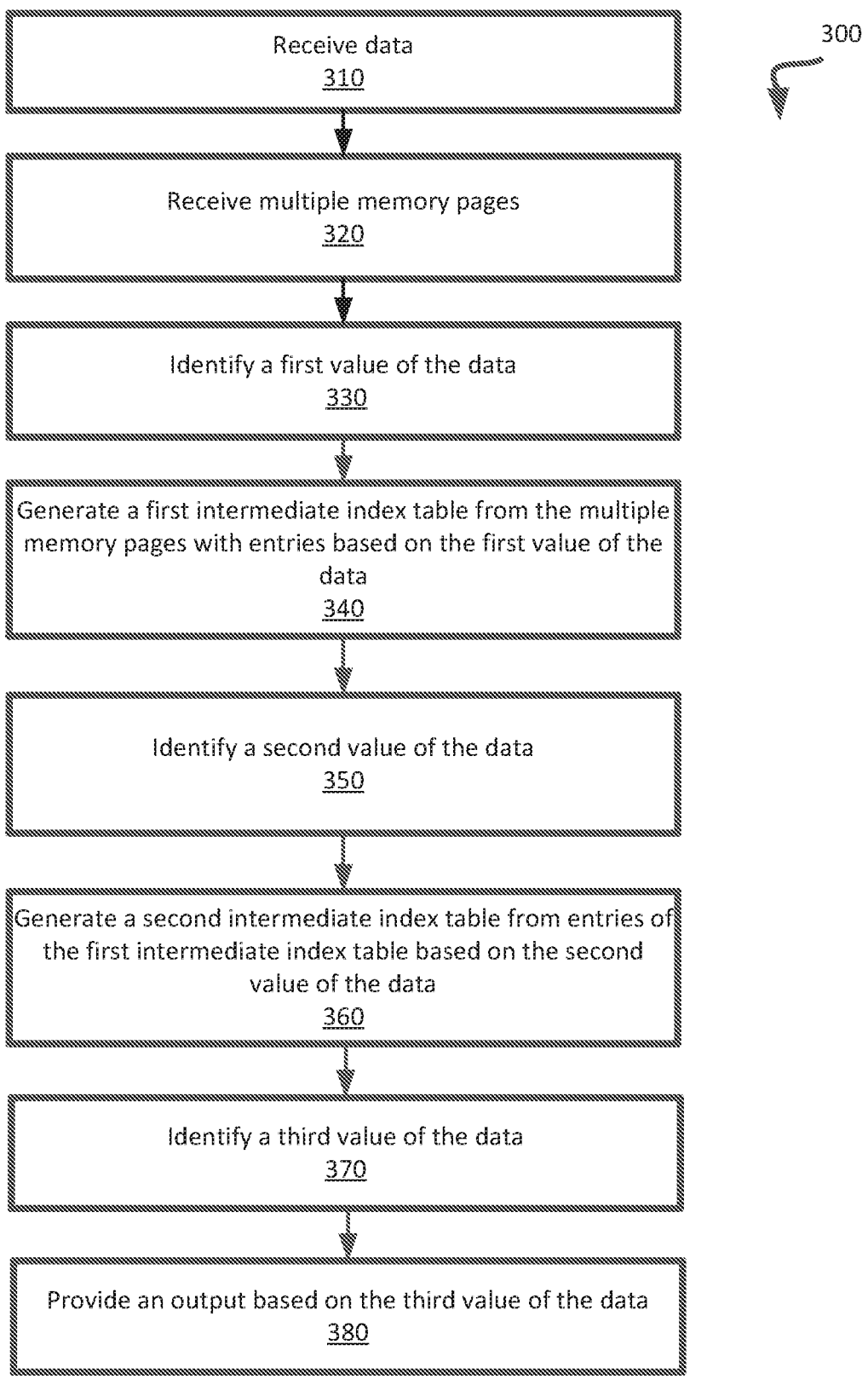
FIG. 3 is a flow diagram of an example method to index memory pages to provide secure memory access in accordance with some embodiments of the present disclosure.

FIG. 3 is a flow diagram of an example method 300 to index memory pages to provide secure memory access. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the security component 130 of FIG. 1.

For simplicity of explanation, the methods of the present disclosure are depicted and described as a series of acts. However, acts in accordance with the present disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 3, the method 300 may begin with processing logic receiving data (block 310). For example, an input data may be received. The input data may be used in a cryptographic operation by a device. The processing logic may further receive multiple memory pages (block 320). The memory pages may include multiple cache lines that are used by the device. The processing logic may further identify a first value of the data (block 330). For example, a value of one or more bits of the data may be identified. The processing logic may generate a first intermediate index table from the multiple memory pages with entries based on the first value of the data (block 340). For example, the cache lines from the memory pages with a portion of an address or other such value that matches the first value of the data may be accessed and retrieved to be stored at the first intermediate index table. In some embodiments, when a cache line is accessed to generate an index table, then the data associated with the cache line and the memory page that includes the cache line are retrieved or used. The processing logic may further identify a second value of the data (block 350). For example, another portion of one or more bits of the data that is different than the one or more bits of the data corresponding to the first value may be identified. The processing logic may generate a second intermediate index table from the entries of the first intermediate index table based on the second value of the data (block 360). For example, the cache lines from the first intermediate index table (and other index tables present in the hierarchy that includes the first intermediate index table) with a portion of an address or other such value that matches the second value of the data may be accessed and retrieved to be stored at the second intermediate index table. Thus, the second intermediate index table may include a subset of the cache lines from the first intermediate index table based on the addresses or other such values of the subset of cache lines matching the second value of the data. Furthermore, the processing logic may identify a third value of the data (block 370) and the processing logic may provide an output based on the third value of the data (block 380). The third value of the data may be used to provide an output. For example, subsequent intermediate index tables may be generated based on the third value. The output that is provided may be identified from the cache line (e.g., a cache line 240 of FIG. 2) with the address or value that matches the data. For example, the address of the cache line (e.g., a cache line 240 of FIG. 2) that matches all of the values of the data may be used to locate the output at a memory.

As such, index tables may be used to identify groups of cache lines that match particular values of an input. A cache line from a particular memory page that matches with the values of the input may be used to generate an output while other cache lines from other memory pages that were accessed from the index tables (e.g., cache lines with values that partially match with the values of the input) are not used to generate the output.

Figure 4:
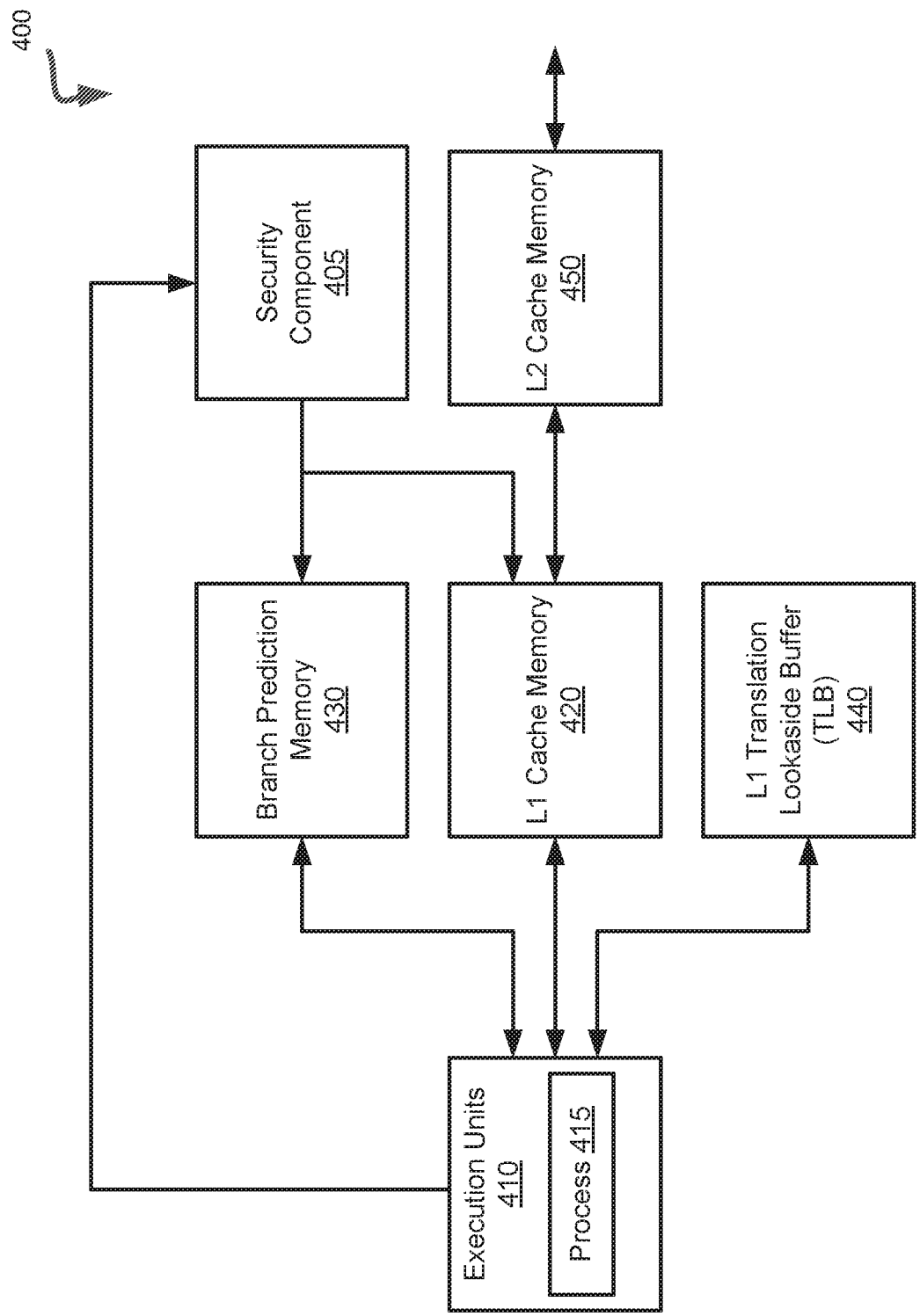
FIG. 4 illustrates an environment to provide secure memory access for a cache memory and a branch prediction memory in accordance with some embodiments of the present disclosure.

FIG. 4 illustrates an environment 400 to provide secure memory access for a cache memory and a branch prediction memory. In general, the secure memory access may be provided by functionality of a security component 405. For example, the environment 400 may correspond to a hardware processor or central processing unit (CPU) that includes the security component 405 to provide secure memory access for various memory components of the processor.

As shown in FIG. 4, the environment 400 may include one or more execution units 410 that provide or execute a process 415. The process 415 may be a user process or may correspond to a secure enclave as described with respect to FIG. 7. The execution units 410 may be processing devices. The environment 400 may further include an L1 cache memory 420, an L1 translation lookaside buffer (TLB), a branch prediction memory 430, an L2 cache memory 450, and a security component 405. The L1 cache memory 420 may be a cache memory for another memory that is accessed by the execution units 410. Furthermore, the L1 TLB 440 may provide translation of virtual memory used by the process 415 to physical memory that is accessed by the execution units 410 for the process 415. The branch prediction memory 430 may store a prediction of a direction of a branch of the process 415. For example, the branch prediction memory 430 may be used to store a particular instruction or instruction sequence based on the branch prediction of the process 415. Furthermore, the L2 cache memory 450 may store additional data from another memory accessed by the execution units 410 that are not yet stored at the L1 cache memory 420.

In operation, the execution of the process 415 may result in the storing of data at the branch prediction memory 430, L1 cache memory 420, L1 TLB 440, and the L2 cache memory 450. The data that is stored may be representative of the execution state or data used by the process 415. For example, the branch prediction memory 430 may be used to store a branch prediction state and the L1 cache memory 420 may store data that was recently used or provided by the process 415. Additionally, the L1 TLB 440 may store translation state data for data associated with the process 415 and the L2 cache memory 450 may store additional data that has been used by the process 415.

When another process is to be provided by the execution units 410, the process 415 may be suspended or terminated and a new process may be executed by the execution units 410. The new process may utilize new data to be stored at the L1 cache memory 420 and a new branch prediction by a branch predictor component for the new process. However, if the data for the prior process is currently stored at the branch prediction memory 430, L1 cache memory 420, or the L1 TLB 440, then the data for the prior process that is stored at the various components may be accessible to the new process, resulting in a security vulnerability for the prior process. For example, the L1 cache memory 420.

Aspects of the present disclosure address the above and other deficiencies by flushing (i.e., removing or deleting) data from the components of the processing device in response to a switching of execution from a process to the execution of another process. In some embodiments, the data from the branch prediction memory 430 and the L1 cache memory 420 may be flushed or removed from the branch prediction memory 430 and the L1 cache memory 420 when a new process is to be executed by the execution units 410. In some embodiments, data from the L1 TLB 440 and the L2 cache memory 450 may also be flushed or removed in response to a switching of execution from the process to another process. As such, the new process may not utilize the data stored at the branch prediction memory 430, the L1 cache memory 420, and any other components that store data that correspond to an execution of a prior process. The security component 405 may identify the changing of execution between processes and may subsequently instruct the components to flush the data that is associated with the prior process. In some embodiments, the security component 405 may be included in the execution units 410 or another component of a processing device.

Advantages of the present disclosure include, but are not limited to, an increase in security for a process. For example, data used during the execution of the process may not be used or accessed by a subsequent process when the data is flushed or removed from various components that store data associated with the execution of the process. Thus, an attacker may not utilize the subsequent process to access data of the prior process that uses information or data of another entity or user.

Figure 5:
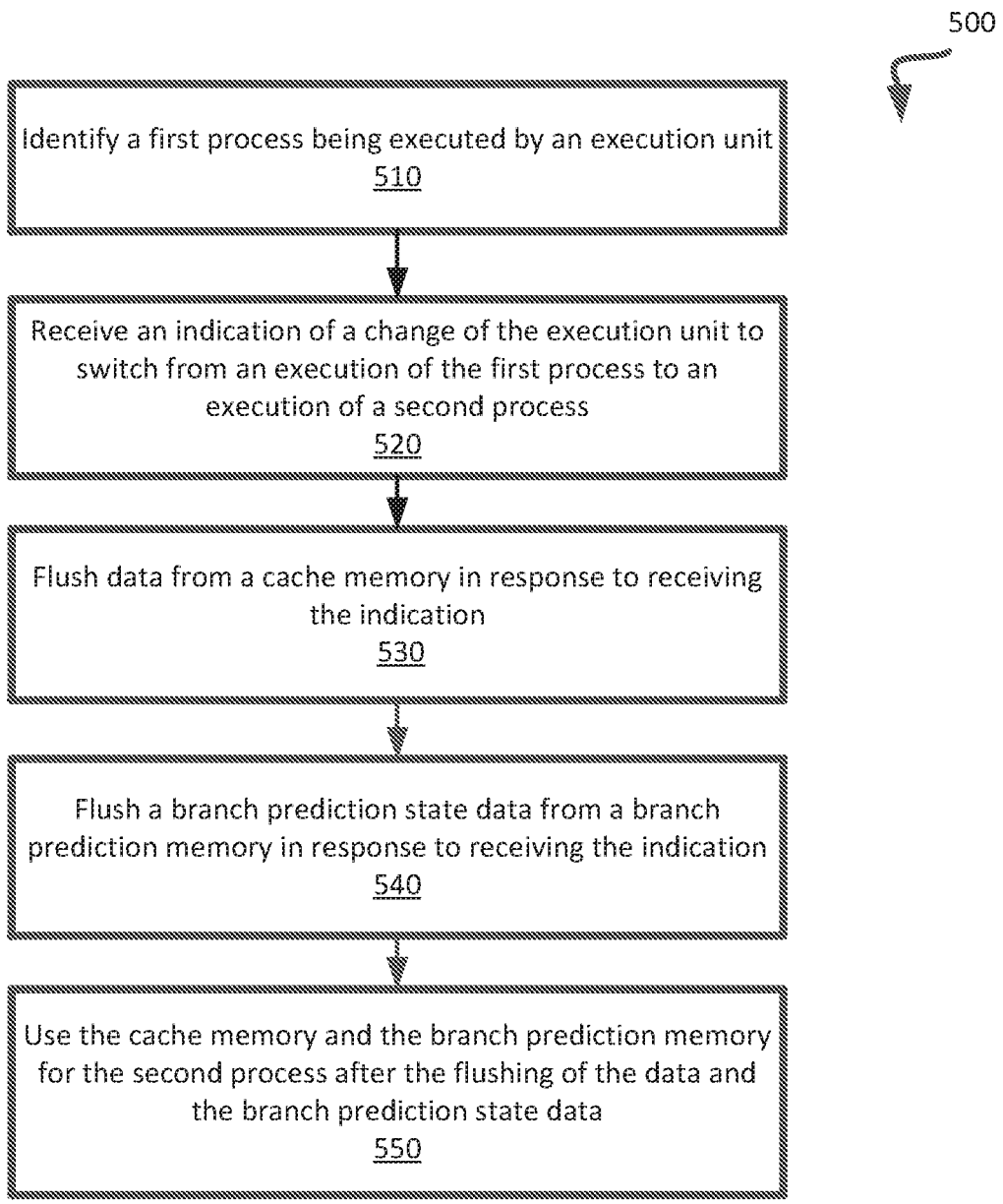
FIG. 5 is a flow diagram of an example method to flush a cache memory and a branch prediction memory based on a change in an execution environment in accordance with some embodiments of the present disclosure.

FIG. 5 is a flow diagram of an example method 500 to flush a cache memory and a branch prediction memory based on a change in an execution environment. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the security component 405 of FIG. 4.

As shown in FIG. 5, the processing logic may identify a first process being executed by an execution unit (block 510). The execution of the first process may result in the storing of data at various components of a processing device (e.g., a CPU). For example, data may be stored at a cache memory (e.g., an L1 cache memory) and a branch prediction state may be stored at a branch prediction memory. The processing logic may further receive an indication of a change of the execution unit to switch from an execution of the first process to an execution of a second process (block 520). For example, the execution unit may receive an indication that the execution of the first process is to be terminated and an execution of the second process is to be initiated. The processing logic may subsequently flush data from a cache memory in response to receiving the indication (block 530) and flush a branch prediction state data from a branch prediction memory in response to receiving the indication (block 540). For example, data that is stored at the cache memory for the first process may be removed or deleted and branch prediction state data at the branch prediction memory may be removed or deleted.

In some embodiments, the data that is stored at the cache memory and the branch prediction memory may be flushed based on identification information associated with the data. The identification information may identify a particular process that has used or provided the data. For example, the data stored at the cache memory may include an address, the underlying data or value, and an identification of the particular process that has used or provided the underlying data or value. In some embodiments, the identification information of the particular process may be a hash value or any other type of value that is assigned to the particular process. Thus, in some embodiments, the data with the identification of the prior process may be flushed or removed from the L1 cache memory and branch prediction memory (and/or other components) in response to receiving an indication that the prior process is to be terminated while other data associated with other processes may not be flushed. Thus, a first subset of stored data may be flushed while a second subset of stored data may not be flushed (e.g., data corresponding to another process).

Referring to FIG. 5, the processing logic may further use the cache memory and the branch prediction memory for the second process after the flushing of the data and the branch prediction state data (block 550). For example, the cache memory may be used to provide data to the second process and the branch prediction memory may store a branch prediction state for the second process.

In some embodiments, the flushing of the cache memory and the branch prediction memory may be based on a privilege level associated with the process that is being terminated. For example, if the process is at a higher privilege level than the next process that is to be executed, then the data for the process with the higher privilege level may be flushed from the cache memory and the branch prediction memory. Otherwise, if the process is at a lower privilege level than the next process, then the data for the process with the lower privilege level may not be flushed from the cache memory and the branch prediction memory.

Figure 6:
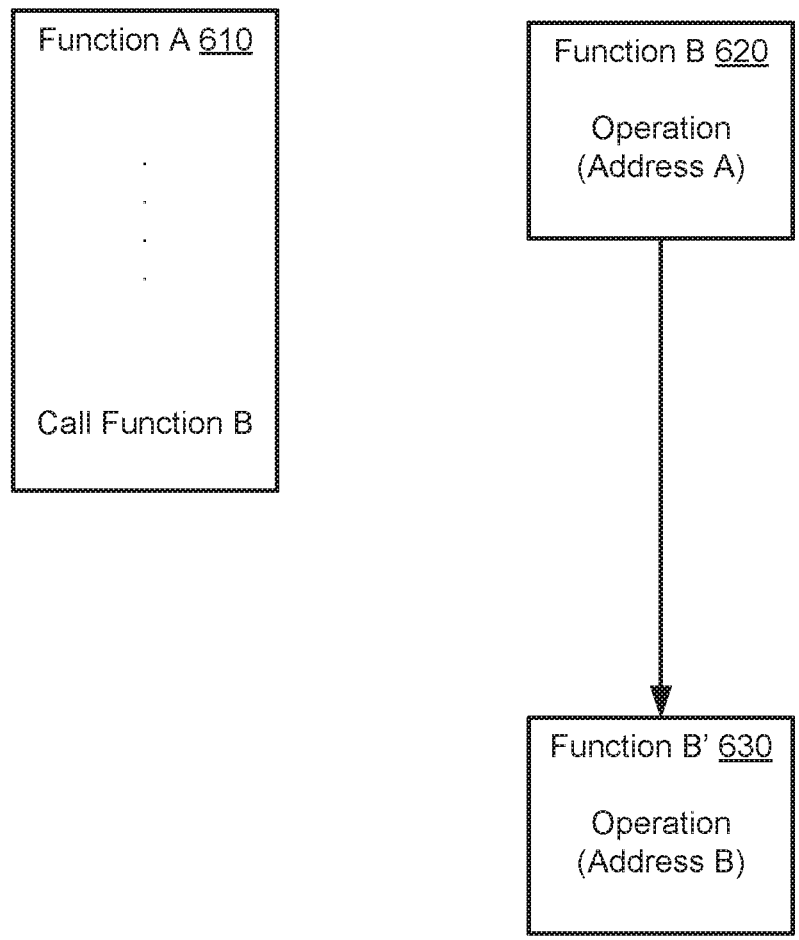
FIG. 6 illustrates a block diagram to change the address for a function in accordance with some embodiments of the present disclosure.

FIG. 6 illustrates a block diagram to change the address for a function. In general, the address for a function may be changed by a security component (e.g., the security component 130 or security component 405).

As shown in FIG. 6, a first function 610 (e.g., function 'A') may perform various operations that include a call to a second function 620 (e.g., a function 'B') The first function 610 and the second function 620 may correspond to executable code that is stored in memory. For example, the first function 610 may be stored at a particular address or memory location and the second function 620 may be stored at another address or memory location. The access of the second function 620 by the first function 610 may result in an access pattern where an observation of the access pattern can result in a susceptibility of a side channel attack of a device when performing the first function 610. To reduce the susceptibility to a side channel attack, the address at which the second function 620 is stored may be changed. For example, the executable code of the second function 620 may be switched from a first address or memory location to a second address or memory location. Thus, when the first function 610 calls the second function 620, the executable code of the second function 620 at the second address or memory location may be retrieved.

When the address corresponding to the second function 620 is changed, then the change may be used by the first function 610 when calling the second function 620 after its address has changed. In some embodiments, the code of the first function 610 may be changed to reflect the new address for the second function 620. Thus, the code of the first function 610 may be modified when the address of the second function 620 changes. In the same or alternative embodiments, when the address of the second function 620 is changed and if the first function 610 provides a call to the second function 620 at its prior address, then a fault may be generated and the new address of the second function 620 may be updated within the first function 610.

In some embodiments, a memory page may be used to identify addresses of multiple functions. Thus, when the address of the second function 620 changes, the memory page may also be updated. Additionally, since the memory page includes the addresses of other functions, the same memory page may be accessed when any of the functions are called by the first function 610. Thus, the first function 610 may provide a call for the second function 620 and the call may be redirected to the memory page that includes the address for the second function 620.

Figure 7:
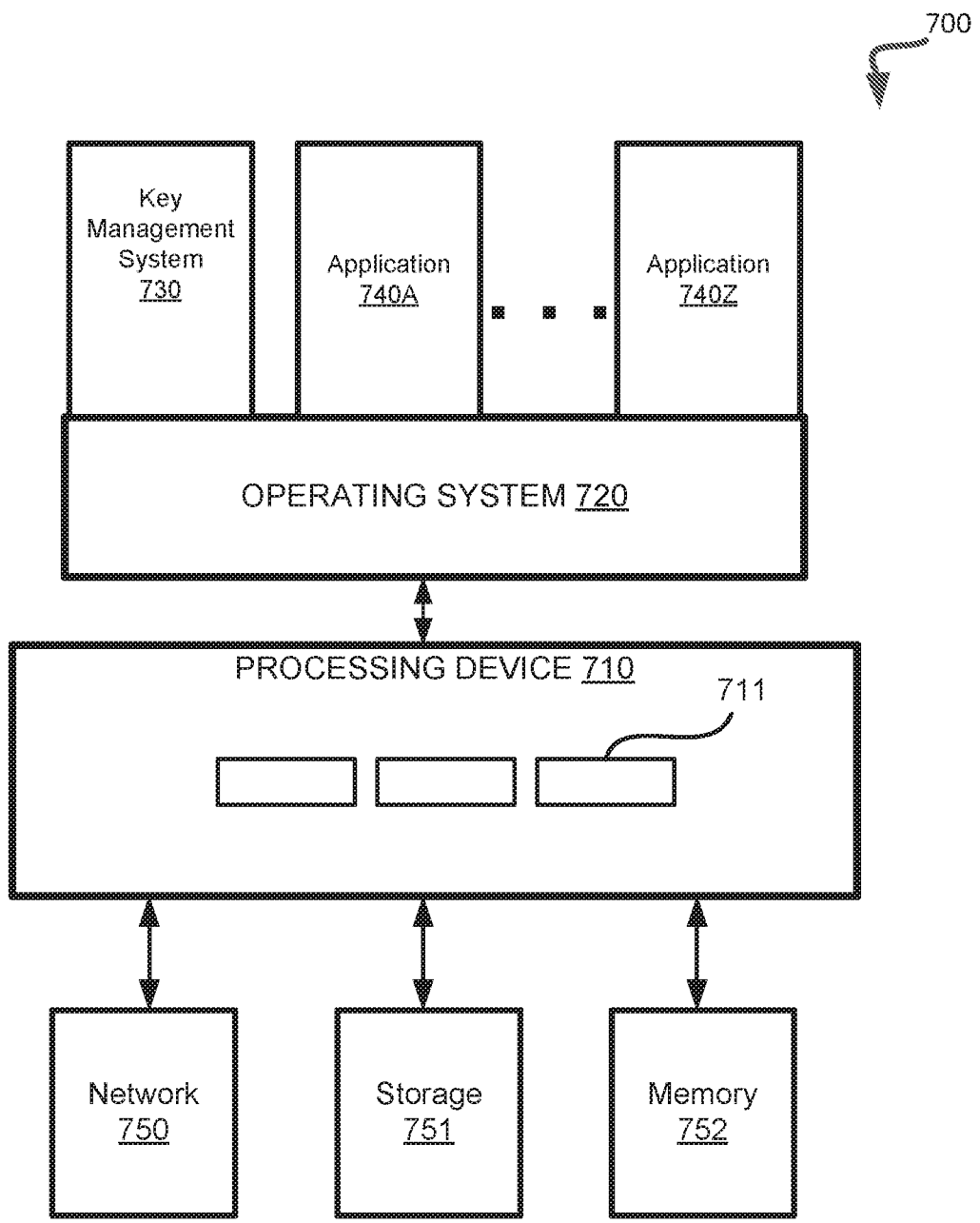
FIG. 7 illustrates an example network server with a secure memory access component for a key management system to provide secure use of a cryptographic key for one or more applications in accordance with some embodiments of the present disclosure.

FIG. 7 illustrates an example network server 700 for a key management system to provide secure use of a cryptographic key for one or more applications. In general, memory pages may be indexed to provide secure memory access for a network server that provides cryptographic operations for one or more other applications 740A to 740Z that are also hosted by the network server or another network server.

As shown in FIG. 7, the network server 700 may include a processing device 710 that may execute an operating system 720. Furthermore, the processing device 710 may include one or more internal cryptographic keys 711 that may be used to encrypt and decrypt data stored in a portion of a memory that is assigned to a secure enclave of the key management system 730. The access to the data of the key management system 730 in the secure enclave (e.g., data stored at a storage resource) may be protected from the one or more applications 740A to 740Z and the operating system 720. For example, the access to the data of the secure enclave corresponding to the key management system 730 may be protected by the use of one of the internal cryptographic keys 711 that are internal to the processing device 710 so that the access to the data is based on a hardware access as opposed to a software access. The operating system 720 may be associated with a first privilege level and the key management system 730 and the applications 740A to 740Z may be associated with a second privilege level where the first privilege level of the operating system is more privileged than the second privilege level of the various applications that are run on the operating system 720 (e.g., the more privileged level allows access to more resources of the network server than the less privileged level). Thus, the operating system 720 may be allowed access to resources of the applications 740A to 740Z. However, since the key management system 730 is assigned to a secure enclave where access to the data of the secure enclave is based on the use of an internal cryptographic key 711 of the processing device 711, the operating system 720 may not be able to access the data of the key management system 730 despite having a more privileged level of access than the key management system 730. The master key that is used to decrypt data at the storage resource may be an internal cryptographic key 711.

In operation, the key management system 730 may be hosted on the network server with the applications 740A to 740Z. The application 740A may perform a function that may use a cryptographic operation with a cryptographic key. In order to securely store the cryptographic key and perform the cryptographic operation securely, the application 740A may establish a connection with the key management system 730. For example, an attestation procedure may be performed by the application 740A to authenticate the key management system 730. After the key management system 730 has been authenticated, a connection may be considered to be established between the application 740A and the key management system 730. The cryptographic key of the application 740A (e.g., used by cryptographic operation) may be provided to the key management system 730. Since the key management system 730 is assigned to a secure enclave, the data of the key management system 730 may be encrypted and protected by the use of an internal cryptographic key 711 (i.e., the master key) of the processing device 710. For example, the key management system 730 may receive the cryptographic key of the application 740A and may transmit an instruction to the processing device 710 to store the received cryptographic key in the memory of its assigned secure enclave. In some embodiments, the key management system 730 may transmit identification information of the key management system 730 to the processing device 710 for the processing device 710 to load the received cryptographic key from the application 740A in the secure enclave of the key management system 730. The processing device 710 may use an instruction to use one of its internal cryptographic keys 711 that is based on the identification of the key management system 730 to store the received cryptographic key in the memory of the secure enclave of the key management system 730. For example, the received cryptographic key may be securely (e.g., encrypted) stored in the storage 751 or memory 752 associated with the processing device 710 or at another storage resource over a network 750 (e.g., at a storage device of the storage resource). In some embodiments, one of the applications 740A to 740Z may provide a request to the key management system 730 to generate a cryptographic key to be used in a cryptographic operation for the respective application 740A to 740Z. For example, the key management system 730 may generate the cryptographic key and may store the cryptographic key in its memory of the secure enclave.

After the cryptographic key of the application 740A has been loaded in the secure enclave, the application 740A may subsequently request for a cryptographic operation to be performed with its cryptographic key. For example, the application 740A may provide a request to the key management system 730 that identifies the cryptographic operation to be performed. The key management system 730 may subsequently use an instruction so that the processing device 710 may use one of its internal cryptographic keys 711 that is based on the identification of the key management system 730 to decrypt the data of the secure enclave of the key management system 730 and to retrieve the cryptographic key. Subsequently, the cryptographic operation may then be performed (e.g., data may be decrypted or data may be signed by using the retrieved cryptographic key) by the processing device 710 and then the output of the cryptographic operation may be provided to the key management system 730 which may return the output to the application 740A. In some embodiments, the internal cryptographic key 711 may be combined with additional information (e.g., the identification information of the key management system 730) to generate the master key for the key management system 730 that is used to decrypt and/or encrypt data associated with the secure enclave of the key management system 730. Thus, since the processing device 710 uses its internal cryptographic key 711 to decrypt data and to perform the cryptographic operation, the cryptographic key received from the application may not be exposed external to the processing device 710.

As such, a network server may run a key management system 730 and an application that may use the key management system 730 for storing or loading keys and managing the use of the keys. Although FIG. 7 illustrates that the key management system 730 may provide secure key management for an application 740A to 740Z on the same network server, the key management system 730 may alternatively be hosted by another network server or may be hosted by another network server that is external to any data center or network cluster that includes the network servers hosting applications 740A to 740Z.

Figure 8:
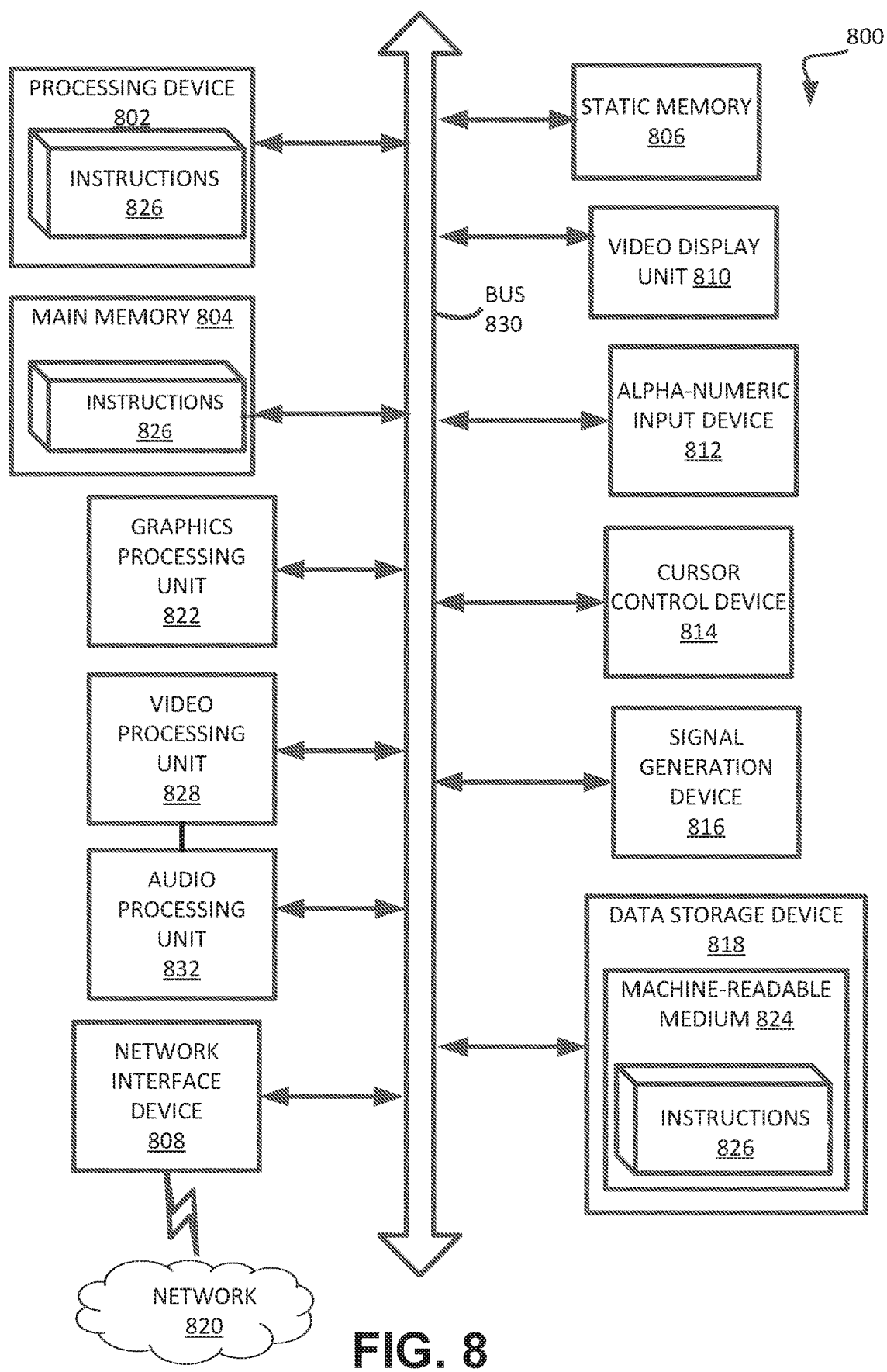
FIG. 8 illustrates an example computer system in which embodiments of the present disclosure operate.

FIG. 8 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality as described herein. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
receiving an input data having a plurality of portions;
identifying a plurality of memory pages, wherein each of the plurality of memory pages comprises one or more cache lines;
generating, by a processing device, a first index table that includes a plurality of cache lines from the plurality of memory pages based on the input data, wherein the generating the first index table comprises:
accessing, in the memory pages, a matching cache line having a value that matches the plurality of portions of the input data and a partially-matching cache line having a value that matches a subset of the plurality of portions of the input data, and
storing, in the first index table, the matching cache line and the partially-matching cache line; and
providing an output data based on a particular cache line from the plurality of cache lines of the first index table, wherein the particular cache line has a value matching the plurality of portions of the input data, and the output data is independent of the partially-matching cache line of the first index table.

2. The method of claim 1, wherein generating the first index table that includes the plurality of cache lines from the plurality of memory pages based on the input data comprises:
identifying cache lines from the plurality of memory pages that include a value that corresponds to a first portion of the input data, wherein the first index table comprises the cache lines that include the value that corresponds to the first portion of the input data and does not include other cache lines that do not include the value that corresponds to the first portion of the input data.

3. The method of claim 2, further comprising:
generating a second index table that includes a plurality of cache lines from the first index table having another value that corresponds to a second portion of the input data.

4. The method of claim 3, wherein the providing of the output data based on the particular cache line from the plurality of cache lines of the first index table is further based on the second index table, the particular cache line being included in the first index table and the second index table.

5. The method of claim 1, wherein the plurality of cache lines and the plurality of memory pages are accessed in response to generating the first index table, and wherein the output value is retrieved by using an address of the particular cache line.

6. The method of claim 1, wherein generating the first index table comprises:
identifying a first cache line associated with a value that corresponds to at least a portion of the input data;
identifying a second cache line associated with the value that corresponds to at least a portion of the input data;
accessing the first cache line at a first memory page of the plurality of memory pages;
accessing the second cache line at a second memory page of the plurality of memory pages, wherein the particular cache line corresponds to the first cache line or the second cache line.

7. The method of claim 1, wherein the generating of the first index table corresponds to an accessing of the plurality of cache lines, and wherein the output data is based on the particular cache line that is accessed and is not based on other cache lines that are accessed.

8. A system comprising:
a memory; and
a processing device, operatively coupled with the memory, to:
receive an input data having a plurality of portions;
identify a plurality of memory pages, wherein each of the plurality of memory pages comprises one or more cache lines;
generate a first index table that includes a plurality of cache lines from the plurality of memory pages based on the input data, wherein to generate the first index table, the processing device is further to:
access, in the memory pages, a matching cache line having a value that matches the plurality of portions of the input data and a partially-matching cache line having a value that matches a subset of the plurality of portions of the input data, and
store in the first index table, the matching cache line and the partially-matching cache line; and
provide an output data based on a particular cache line from the plurality of cache lines of the first index table, wherein the particular cache line has a value matching the plurality of portions of the input data, and the output data is independent of the partially-matching cache line of the first index table.

9. The system of claim 8, wherein to generate the first index table that includes the plurality of cache lines from the plurality of memory pages based on the input data, the processing device is further to:
identify cache lines from the plurality of memory pages that include a value that corresponds to a first portion of the input data, wherein the first index table comprises the cache lines that include the value that corresponds to the first portion of the input data and does not include other cache lines that do not include the value that corresponds to the first portion of the input data.

10. The system of claim 9, wherein the processing device is further to:
generate a second index table that includes a plurality of cache lines from the first index table having another value that corresponds to a second portion of the input data.

11. The system of claim 10, wherein the providing of the output data based on the particular cache line from the plurality of cache lines of the first index table is further based on the second index table, the particular cache line being included in the first index table and the second index table.

12. The system of claim 8, wherein the plurality of cache lines and the plurality of memory pages are accessed in response to generating the first index table, and wherein the output value is retrieved by using an address of the particular cache line.

13. The system of claim 8, wherein to generate the first index table, the processing device is further to:
   identify a first cache line associated with a value that corresponds to at least a portion of the input data;
   identify a second cache line associated with the value that corresponds to at least a portion of the input data;
   access the first cache line at a first memory page of the plurality of memory pages;
   access the second cache line at a second memory page of the plurality of memory pages, wherein the particular cache line corresponds to the first cache line or the second cache line.

14. The system of claim 13, wherein the generating of the first index table corresponds to an accessing of the plurality of cache lines, and wherein the output data is based on the particular cache line that is accessed and is not based on other cache lines that are accessed.

15. A non-transitory computer readable medium comprising data that, when accessed by a processing device, cause the processing device to perform operations comprising:
   receiving an input data having a plurality of portions;
   identifying a plurality of memory pages, wherein each of the plurality of memory pages comprises one or more cache lines;
   generating a first index table that includes a plurality of cache lines from the plurality of memory pages based on the input data, wherein to generate the first index table, the operations further comprise:
      accessing, in the memory pages, a matching cache line having a value that matches the plurality of portions of the input data and a partially-matching cache line having a value that matches a subset of the plurality of portions of the input data, and
      storing, in the first index table, the matching cache line and the partially-matching cache line; and
   providing an output data based on a particular cache line from the plurality of cache lines of the first index table, wherein the particular cache line has a value matching the plurality of portions of the input data, and the output data is independent of the partially-matching cache line of the first index table.

16. The non-transitory computer readable medium of claim 15, wherein to generate the first index table that includes the plurality of cache lines from the plurality of memory pages based on the input data, the operations further comprise:
   identifying cache lines from the plurality of memory pages that include a value that corresponds to a first portion of the input data, wherein the first index table comprises the cache lines that include the value that corresponds to the first portion of the input data and does not include other cache lines that do not include the value that corresponds to the first portion of the input data.

17. The non-transitory computer readable medium of claim 16, wherein the operations further comprise:
   generating a second index table that includes a plurality of cache lines from the first index table having another value that corresponds to a second portion of the input data.

18. The non-transitory computer readable medium of claim 17, wherein the providing of the output data based on the particular cache line from the plurality of cache lines of the first index table is further based on the second index table, the particular cache line being included in the first index table and the second index table.

19. The non-transitory computer readable medium of claim 15, wherein the plurality of cache lines and the plurality of memory pages are accessed in response to generating the first index table, and wherein the output value is retrieved by using an address of the particular cache line.

20. The non-transitory computer readable medium of claim 15, wherein the generating of the first index table corresponds to an accessing of the plurality of cache lines, and wherein the output data is based on the particular cache line that is accessed and is not based on other cache lines that are accessed.

* * * * *